Figure 1:
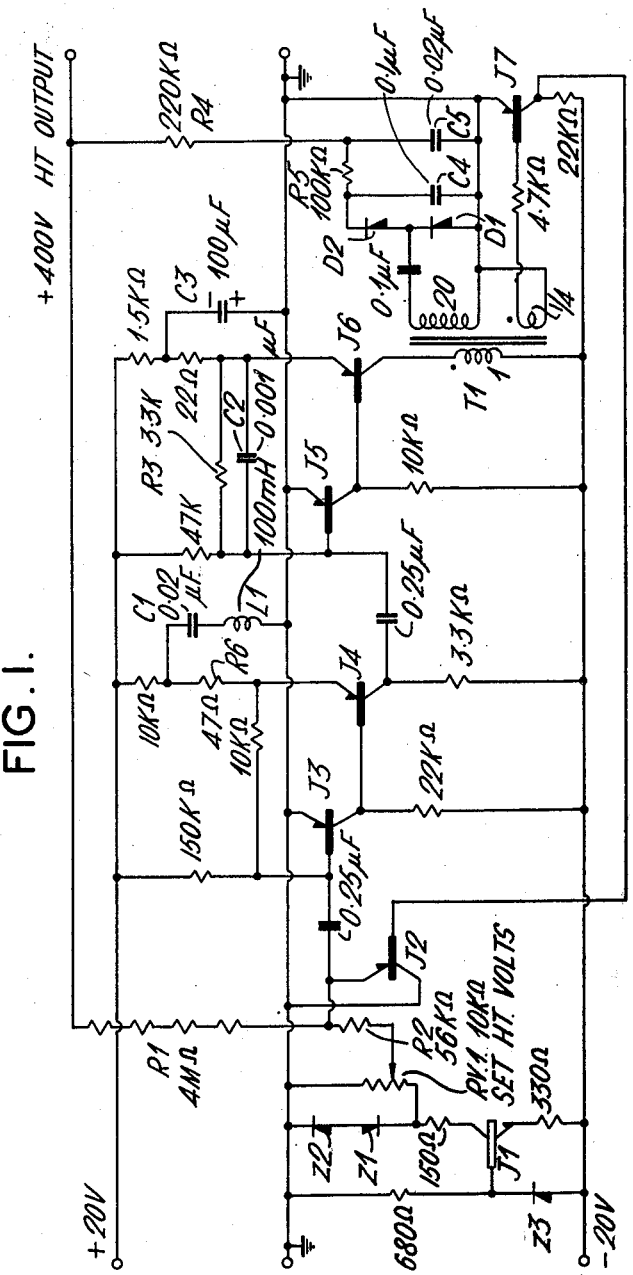

(a)—Without feedback
(b)---With feedback (a)—Without feedback
(b)---With feedback (a)—Without feedback
(b)---With feedback

United States Patent Office 3,191,126
Patented June 22, 1965

3,191,126
D.C. AMPLIFIERS
Eliot Patrick Fowler, Dorchester, England, assignor to United Kingdom Atomic Energy Authority, London, England
Filed Feb. 16, 1962, Ser. No. 173,797
4 Claims. (Cl. 330—9)

This invention relates to D.C. amplifiers and has one application in voltage converters.

A need frequently exists for generating very stable high voltages from relatively low voltage supplies. In portable equipment, because of the cost and weight of high voltage batteries, it is attractive to generate all supplies from low voltage batteries, whereas in installed or mains-driven equipment, improved stability is the goal. The supplies considered in the present specification are those of, say, 300 volts to 3 kv. used for energising ionisation chambers, all kinds of nuclear radiation counters and photomultiplier tubes.

For portable equipment it is common practice to use a simple form of self-excited oscillator driving a voltage multiplier through a step-up transformer. A corona stabiliser or neon is then connected in the output circuit to give shunt stabilisation. Conversion efficiency can be very high, especially toward the end of the battery life, but this requires resetting of the shunt regulator current from time to time. As with all shunt circuits, it is not very efficient if a large variation in load is anticipated.

In installed equipment it is undesirable to have to set up the supply unit. However, there is no need to go to great lengths to get high conversion efficiency and so various comparator-type stabilising circuits have been devised. In these a resistor chain is used to compare the output voltage with a reference voltage. The error signal derived from this comparison is amplified and used to control the output voltage in some way.

The ultimate stability of a good comparator type supply should reside in the resistors or possibly the reference voltage. In practice many supplies are limited by temperature drifts in the early stages of their error signal amplifiers. One converter embodying the present invention has an amplifier giving a stability against temperature change, referred to the input, several times better than can be obtained from the best resistors now available for use in the comparator chain (15 parts/million/° C.) or of the best voltage reference diodes (10 parts/million/° C.). Its response to supply changes can be made better than 1 part in 500 (4 mv. change in 400 v. for 1 volt change in the 20 volt supply, but as this supply would normally be regulated, the mains change effect can be neglected).

According to the present invention a D.C. amplifier comprises means for modulating a D.C. input signal, an A.C. amplifier for amplifying the modulated input signal, means for applying the A.C. output of the amplifier to drive the modulating means whereby the circuit oscillates for a given polarity of input only, means for defining the oscillation frequency, and non-phase-sensitive rectifying means connected to the output of the A.C. amplifier for producing a D.C. output voltage.

The A.C. amplifier may be tuned to constitute the means for defining the oscillation frequency, and may comprise at least two stages connected in cascade, only the first stage being tuned. The first stage of the A.C. amplifier may comprise two transistors arranged in a D.C.-coupled ring-of-two circuit having negative feedback between the emitter of the second and the base of the first transistor, the emitter resistor of the second transistor being decoupled by a series-resonant circuit to effect the tuning.

The modulating means may be a transistor chopper.

A negative feedback connection may be provided between the D.C. output of the amplifier and the input of the modulating means.

A voltage converter according to the present invention comprises a D.C. amplifier as aforesaid having a step-up transformer preceding said rectifying means, a negative feedback resistor connected between the rectified D.C. output and the input of the modulating means, and a reference voltage source with which the fedback D.C. output is compared.

Figure 2:
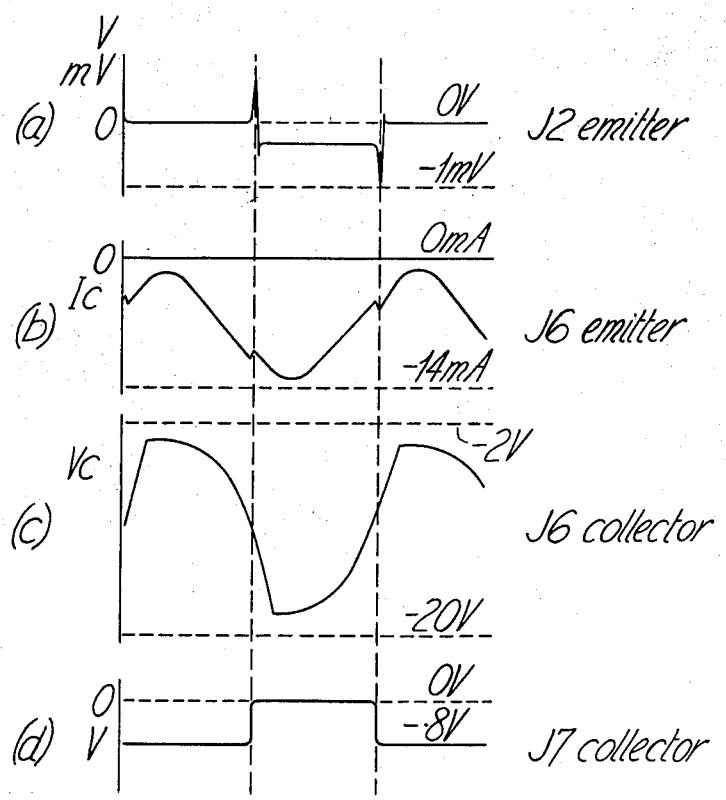

To enable the nature of the present invention to be more readily understood, attention is directed, by way of example, to the accompanying drawings wherein FIG. 1 is a circuit diagram of a voltage converter embodying the invention, FIG. 2 shows waveforms in the circuit of FIG. 1, FIGS. 3, 4 and 5 show curves of input/output characteristics for three types of chopper amplifier, with and without overall negative feedback.

FIG. 1 shows a transistor circuit for converting a 40 v. input supply to a stable 400 v. output. The reference voltage is developed across a Zener diode Z2 which is fed from a constant-current source comprising a transistor J1 having another Zener diode Z3 connected between its base and —20 v. Z1 is connected in series with Z2 to provide temperature compensation. The voltage across Z2 is applied via a potentiometer RV1 to the lower end of the comparator resistor chain R1, R2, whose upper end is connected to the +400 v. output. The junction of R1 and R2 is connected to the emitter of a transistor J2 which operates as a chopper and modulates the input signal applied to its emitter. The chopper drive is applied to the base of J2. The chopper action of this circuit is described by Chaplin and Owens in I.E.E. Paper No. 2382 (July 1957).

The square-wave output from the chopper (FIG. 2(a)) is fed to an A.C. amplifier having two ring-of-two stages connected in cascade comprising respectively transistors J3 and J4 and transistors J5 and J6, having gains of 200 and 150. These ring-of-two circuits are described by Chaplin, Candy and Coles in I.E.E. Paper No. 2892 (May 1959). The first ring-of-two stage is tuned by providing a series resonant circuit, L1, C1 to decouple the emitter resistor R6 of J4, in place of the simple capacitor C3 used in the second ring-of-two stage. In the latter a capacitor C2 is connected in parallel with the feedback resistor R3 to provide top cut.

The collector of the final amplifying transistor J6 is connected to —20 v. through the primary winding of a step-up transformer T1, one output winding of which is connected to a conventional Cockcroft-Walton voltage-doubling circuit and provides the +400 v. output voltage. Another winding is connected to the base of a transistor J7 which acts as a squarer and whose output is the drive for the chopper transistor J2 (FIG. 2(d)).

The comparator point is the junction of R1 and R2 and normally assumes a voltage level just below earth. As this point is for half the time grounded by the chopper transistor J2, the chopper waveform of FIG. 2(a) is generated, the spikes on which are filtered out by the tuned first stage J3, J4 and by the top cut of the second stage J5, J6. The drive current to the output transformer T1 is shown in FIG. 2(b) and the resultant transformer voltage in FIG. 2(c). Because the first stage is tuned and the second stage has a high output impedance, the drive to the transformer is a sensibly sinusoidal current, whilst the voltage waveform is determined by the non-linear impedance of the rectifiers Z4, Z5 and the reservoir capacitor C4 in the output. The squarer transistor J7 is bottomed for half the cycle as shown in FIG. 2(d), while during the other half-cycle the collector load of J7 holds J2 conducting. While J7 is bottomed, J2 is cut off and the junction of R1 and R2 finds its reference level.

Figure 3:
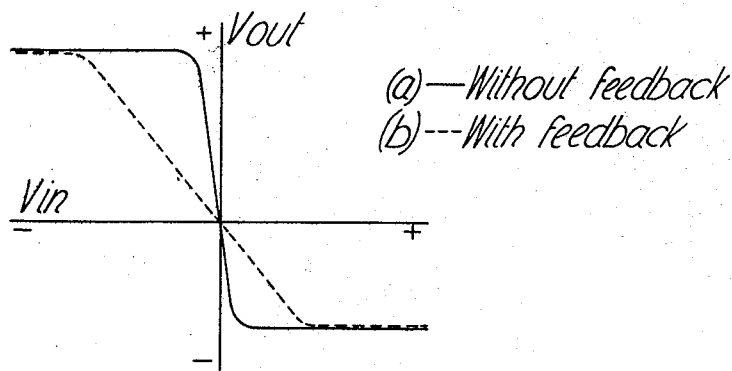
Figure 4:
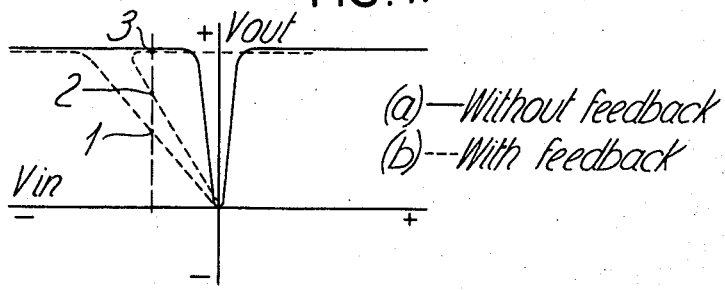

In a conventional D.C. chopper amplifier, the output is taken from a phase-sensitive detector. In this way a positive D.C. input can be made to give a negative D.C. output and vice versa. This is shown in FIG. 3, which shows curves of the input/output characteristics (a) without, and (b) with, overall feedback. However, phase-sensitive rectifiers are inefficient in general, and it would be difficult to design one for operation at high voltages. For the present purpose a negative output is not required, and a simple (non-phase-sensitive) output rectifier would be satisfactory were it not for a difficulty which arises when the overall negative feedback is applied via the comparator chain. In FIG. 4 curve (a) shows the response without feedback and curve (b) the response with negative feedback using a simple output rectifier. The three numbered points on curve (b) indicate three possible output voltages for a given input voltage, point 2 being unstable. Although the system would work at point 1, it would be very easy for it to run away and generate maximum volts as at point 3.

Figure 5:
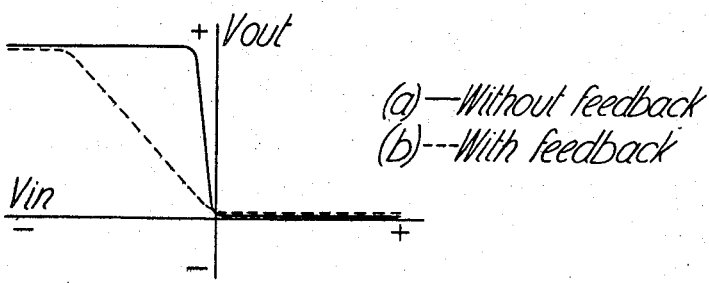

FIG. 5 shows response curves (a) and (b) for the present arrangement in which the input chopper is driven from the A.C. output of the amplifier. This normally provides positive feedback at the chopping frequency and maintains the whole circuit in oscillation, the amplitude of oscillation being limited by the normally negative reference level at the junction of R1 and R2. If the D.C. level at this point should go positive, the A.C. feedback from the transformer to the chopper reverses in phase, the normally positive feedback becomes negative, and oscillation ceases.

The oscillating frequency is determined by the resonant frequency of L1 and C1 in series, at which frequency the gain of the first ring-of-two stage (J3, J4) is a maximum. With the values shown the oscillating frequency is about 3.5 kc./s.

Converters embodying the invention have been designed for a range of applications, using the expressions derived below.

*Symbols*

$I_o$=Maximum D.C. output (load) current.
$V_o$=Maximum D.C. output (load) voltage.
$i_c$=Peak A.C. current in J6 collector.
$v_c$=Peak A.C. voltage on J6 collector.
$I_R$=Rectifier reverse leakage current.
$V_R$=Rectifier forward voltage drop.
$n$=Transformer ratio.
$N_R$=Number of rectifier sections (multiplying factor of Cockcroft-Walton circuit).
$\alpha_1, \alpha_2$=Circuit gains of the two A.C. stages (J3, J4 and J5, J6).

Starting with the required maximum output current and voltage, and allowing for the drop in the protecting resistor R4 and smoothing resistor R5, the peak output current and voltage are $$i\text{ peak} = N_R\sqrt{2}I_o$$

$$v\text{ peak} = \frac{V_o + (R4+R5)I_o}{N_R}$$

As the output from the second stage is at high impedance (a current amplifier ring-of-two) a sinusoidal charging current is obtained in the reservoir capacitor C4.

The amplifier output peak current and voltage are therefore given by $$i_c = \sqrt{2}n.N_R(I_o + I_R)$$

$$v_c = \frac{(V_o + (R4+R5)I_o + V_R)}{2n.N_R}$$

These figures give the standing voltage on the collector and the standing current if the output transformer losses are neglected. Transformer calculations show an increase of about 10% to be necessary.

As already stated, the oscillating frequency is set by the tuned circuit L1, C1, in the first stage. Of the factors which determine the optimum frequency, the most important is the design of the output transformer T1. As this transformer has a large step-up ratio, the primary inductance tends to be rather low. To keep the magnetising current within reasonable limits the frequency should be as high as possible, but it should not be higher than the resonant frequency of the transformer magnetising inductance with the stray capacity of the windings. Smoothing of the D.C. output is clearly easier at higher frequencies, and in practice frequencies of 2–5 kc./s. are possible with readily designed transformers.

The output impedance can be readily calculated. As the A.C. collector current is equal to $$\frac{\alpha_1.\alpha_2}{2}.I_e$$

where $I_e$ is the error current from R1 and R2, and as all the error current must come through R1, then $$\text{Output impedance} = \frac{I_e}{I_o}.R1$$

$$= \frac{2\sqrt{2}.n.N_R.R1}{\alpha_1.\alpha_2}$$

For the values shown the output impedance is 15 k.

The provision of a series output resistor to protect against short-circuits and accidents to users (R4 in the described embodiment) normally increases the output impedance of a voltage supply. In the present converter, and in principle in all voltage supplies using a comparator chain, any value of protecting resistor can be used following the smoothing capacitor (C5) without altering the output impedance. The only limitation in the present converter is the voltage drop across the resistor, which has to be provided on top of the normal load voltage. The same principle applies to the smoothing resistor R5, so that ripple can be made very small without affecting the performance. The ripple in the described embodiment is about 7 mv. with an output current of 100 μa.

Used as a variable output supply the circuit is very flexible and will give an output voltage of one-tenth maximum with an unchanged output impedance. At the lower voltages a much increased maximum current is available.

The described converter can be modified to provide a negative instead of a positive output voltage by providing a positive reference voltage, e.g. feeding Z2 from a positive supply, reversing the phase of the connection to the base of J7, and reversing the rectifiers D1 and D2 in the voltage-doubling circuit.

The transistors in the described embodiment are of the following types:

J1—3N35  J5—GET 104
J2—OC 201  J6—GET 111
J3—GET 104  J7—GET 104
J4—GET 104

The diodes and rectifiers are as follows:

Z1—VR 625  D1—K3/10T
Z2—VR 625  D2—K3/10T
Z3—VR 7

The efficiency of the circuit of FIGURE 1 can be improved by making J5 an n-p-n instead of a p-n-p transistor. This allows the emitter of J6 to sit at +10 v. instead of at −1.5 v. as in FIGURE 1, which in turn makes a higher voltage available at J6 collector and so allows a greater voltage swing on the primary of T1. A further increase in efficiency can be effected by making J6 operate under Class B conditions instead of Class A conditions as described.

Although the present amplifier has been described with reference to its embodiment in a voltage converter, it can be used in other low-drift amplifier applications where only one polarity of output is required. In such applications voltage multiplication of the A.C. amplifier output would not normally be required and would be replaced by simple rectification. Furthermore in other applications the negative feedback need not necessarily be resistive. If desired, the present amplifier may be followed in a known manner by a D.C.-coupled amplifier to give better overall bandwidth, the negative feedback being applied overall between the output of the D.C.-coupled amplifier and the input to the present amplifier.

The present invention is not restricted to using the particular type of transistor A.C. amplifier described, nor to using transistors; valves may also be used. Similarly the transistor chopper can be replaced by other forms of modulator, including electromechanical chopper or variable-capacity devices. In such cases it may not be necessary, in some applications, to use a tuned amplifier, as it can be arranged that the circuit oscillates at the mechanical resonance of the electromechanical device.

I claim:

1. A direct current amplifier comprising an alternating current amplifier having an input connected to a direct current signal source and an output providing an output waveform, an electronic switch connected to said alternating current amplifier input and said direct current signal source to modulate the direct current signal into a modulated waveform to said amplifier input, a drive connection connected to said electronic switch for actuating the same by a modulating waveform to provide said modulated waveform, the frequency of said modulating waveform being equal to that of said output waveform, means connecting said alternating current amplifier output to said drive connection for applying a portion of said output waveform to said electronic switch through said drive connection, said connecting means including means for coordinating the phase relationship of said applied portion of the output waveform to a predetermined polarity of the direct current input signal to generate said modulated waveform received by said amplifier input, and a non-phase-sensitive rectifier connected to the output of said amplifier to rectify the remaining portion of said output waveform to produce a direct current output.

2. A direct current amplifier as claimed in claim 1 wherein the alternating current amplifier is tuned to the modulating frequency.

3. A direct current amplifier as claimed in claim 2 wherein the means for applying a portion of the substantially sinusoidal output waveform of the alternating current amplifier to said electronic switch through said drive connection comprises a square-wave circuit.

4. A direct current amplifier as claimed in claim 1 wherein said electronic switch comprises a transistor.

References Cited by the Examiner

UNITED STATES PATENTS

| 2,953,752 | 9/60 | Porter | 330—9 |
| 3,047,815 | 7/62 | Boose | 330—9 X |
| 3,089,097 | 5/63 | Bell | 330—9 |

OTHER REFERENCES

Article from "Electronics," April 1, 1955, pages 135–137, "Transistor Choppers For Stable D-C Amplifiers," by Bright and Kruper.

ROY LAKE, *Primary Examiner.*

NATHAN KAUFMAN, *Examiner.*